350-96.32
1/9/79  XR  4,133,664

United States Patent [19]
Aulich et al.

[11] 4,133,664
[45] Jan. 9, 1979

[54] APPARATUS AND METHOD FOR PRODUCING LIGHT CONDUCTING FIBERS HAVING A CORE DISPOSED IN A LOOSE FITTING CLADDING TUBE

[75] Inventors: Hubert Aulich, Munich; Josef Grabmaier, Kempfenhausen; Karl-Heinz Eisenrith, Schliersee, all of Germany

[73] Assignee: Siemens Aktiengesellschaft, Berlin & Munich, Germany

[21] Appl. No.: 810,760

[22] Filed: Jun. 28, 1977

[30] Foreign Application Priority Data

Jul. 1, 1976 [DE] Fed. Rep. of Germany ....... 2629658

[51] Int. Cl.$^2$ ............................................. C03B 37/02
[52] U.S. Cl. ..................... 65/3 A; 65/11 W; 65/32; 65/121; 65/DIG. 7; 264/1; 264/174; 425/131.5; 350/96.32
[58] Field of Search ............... 65/3 A, 32, 11 W, 121, 65/DIG. 7; 264/1, 174, 176 F; 425/131.5, 133.1; 350/96.32

[56] References Cited

U.S. PATENT DOCUMENTS

| | | | |
|---|---|---|---|
| 3,791,806 | 2/1974 | Koizumi et al. | 65/121 X |
| 3,960,530 | 6/1976 | Iyengar | 65/121 X |
| 4,023,953 | 5/1977 | Megles et al. | 65/121 X |
| 4,032,313 | 6/1977 | Tokuhara | 65/11 W X |
| 4,046,537 | 9/1977 | Deserno et al. | 65/3 A X |

OTHER PUBLICATIONS

"Eccentric-Core Glass Optical Waveguide" Miyashita et al.
Ibaraki Electrical Communication Lab., Tokai Ibaraki, Japan, pp. 808, 809, Journal of Applied Physics, vol. 45, No. 2, Feb. 1974, Data Distribution Using Fiber Optics, M. K. Barnoski.
Applied Optics, vol. 14, No. 11, Nov. 1975.

*Primary Examiner*—Robert L. Lindsay, Jr.
*Attorney, Agent, or Firm*—Hill, Gross, Simpson, Van Santen, Steadman, Chiara & Simpson

[57] ABSTRACT

A method and apparatus for producing a light conducting fiber having a core disposed in a loose fitting cladding tube characterized by a double crucible arrangement having a first crucible for a melt of the material for the cladding tube and a second crucible for the melt of the material of the core. The second crucible has an orifice of a given diameter and the first crucible has a ring-shaped orifice with an inner diameter greater than the given diameter of the orifice of the second crucible with the center of the ring-shaped orifice being arranged substantially on a central axis of the orifice of the second crucible so that a core drawn from the orifice of the second crucible is substantially concentrically disposed within the tube of material drawn from the ring-shaped orifice. In each embodiment of the apparatus, the first crucible is an annular crucible having a ring-shaped cross section and the second crucible is either disposed above the first crucible so that the core drawn from the second crucible passes through a hollow passage or is disposed in the central space either with spacing from the walls of the first crucible or with the inner wall of the first crucible forming the wall of the second crucible. Preferably, an inert gas is injected between the core and the tube to prevent collapsing of the tube during the drawing of the fiber.

10 Claims, 5 Drawing Figures

APPARATUS AND METHOD FOR PRODUCING LIGHT CONDUCTING FIBERS HAVING A CORE DISPOSED IN A LOOSE FITTING CLADDING TUBE

BACKGROUND OF THE INVENTION

1. Field of the Invention

The present invention is directed to a method and apparatus for producing light conductive fibers which have a core disposed in a loose fitting cladding tube.

2. Prior Art

A light conductor fiber, which has a core of highly refined quartz glass disposed in a loose fitting sleeve or tube of synthetic material is disclosed by P. Kaiser, A. C. Hart, Jr. and L. L. Blyler, Jr., "Low-Loss FEP-Clad Silica Fibers," *Applied Optics*, Vol. 14, No. 1, Jan. 1975, pp. 156–162. However, in these known light conductor fibers, a series of problems may occur. For example, contamination at the surface of the core can occur during the production of the loose fitting sleeve or tube on the light conducting cores. These contaminations will lead to an increased dispersion in the fiber so that the properties of the fibers are not reproducible. Moreover, the materials such as water can diffuse through the tube or sleeve of synthetic material and contaminate the core of the fiber. Furthermore, a danger, that the synthetic material of the tube will crystallize out and cause an increase of the value of the dampening of the light conductor fiber, also exists. Since the synthetic material of the sleeve or tube already has a relatively high dampening value, the light conducting fibers will possess only a low numerical aperture.

Another well known type of light conducting fiber comprises a core, which generally consists of a highly refined glass, and a tightly fitting sleeve or cladding which consists of a less refined glass. The compounds of the glass for the core is selected in such a manner that the refractive index of the core material is larger than the refractive index of the sleeve or cladding. Since the core and cladding form a compact unit and since it is possible during the stretching or drawing of such a light conductive fiber for the fiber core to be moved from an exactly concentric position within the cladding, considerable difficulties can arise during the connection of two such fibers such as during calibration. Any small alteration of the geometry of the fiber end surfaces, which are to be connected, for example one core being offset from the axis of the other core, will lead to a high coupling loss. Moreover, the space factor of the core is decreased by the presence of the cladding during a splicing of several individual fibers within a tight fitting sleeve. Each of these difficulties is discussed by M. K. Barnoski, "Data Distribution Using Fiber Optics," *Applied Optics*, Vol. 14, No. 11, November 1975, 11. 2571–2577.

In order to obtain an acceptance angle, which is as large as possible during coupling of light into a light conductive fiber, the difference between the index of refraction of the core relative to the cladding must be as large as possible. However, since the thermal and chemical properties of the different glasses for the cladding and for the core have to be precisely adjusted to one another, the difference in the index of refraction of the core relative to the cladding for a light conductive fiber with a tight fitting cladding cannot be generally increased in an arbitrary fashion. When the materials, which are used for the core and cladding, have too large a difference in their thermal coefficients of expansion, problems with cracks occurring during the formation of the light conducting fibers will be present. Chemical incompatabilities of the different glasses used for the core and cladding can lead to crystallite formations and phase separation at the boundary areas between the core and cladding.

In an attempt to overcome these problems, an article by T. Miyaskita, T. Edahiro, S. Takahashi, M. Horigushi and K. Masuno, entitled "Eccentric-Core Glass Optical Waveguides," *Journal of Applied Physics*, Vol. 45, No. 2, February 1974, pp. 808–809, suggested an eccentric-core optical fiber in which highly refined core of quartz glass was melted or attached at only one line to a boron silicate sleeve or tube. However, in this type of fiber construction, chemical and thermal properties of the core and the cladding tube or sleeve have to be adjusted to one another. In addition, the production of these fibers is accomplished with a rod-tube method, which uses a workpiece that comprises a glass rod for the core inserted into a glass tube for the sleeve or cladding and the rod-tube workpiece or unit is subsequently heated and drawn into a fiber. As a result of this method, reproducible results for the fibers can only be obtained with difficulties.

SUMMARY OF THE INVENTION

The present invention is directed to an apparatus and method for producing light conductive fibers having a core disposed in a loose fitting cladding tube with a space therebetween, which apparatus and method do not have the above mentioned difficulties which occurred with the prior art method of forming a light conductive fiber having the core in a loose fitting cladding tube. In addition, the light conductive fiber with the loose fitting cladding tube of glass formed by the apparatus and method of the present invention also does not have the disadvantages which occur in light conducting fibers with a tight fitting cladding or the eccentric-core optical fiber. The method and apparatus in accordance with the present invention makes it possible to produce a light conductive fiber with a highly refined glass core in a loose fitting glass sleeve or tube in a continuous process and with reproducible results.

To accomplish these tasks, the present invention utilizes an apparatus comprising a double crucible arrangement having a first crucible for accommodating a melt for the cladding tube and a second crucible for accommodation of a melt for the core, said second crucible being provided with a circular orifice of a given diameter and the first crucible having a ring-shaped orifice with an inner diameter greater than the given diameter of the circular orifice of the second crucible, said first and second crucibles being arranged with the center of the ring-shaped orifice being substantially on a central axis of the circular orifice of the second crucible with the inner diameter of the ring-shaped orifice being spaced from the periphery of the circular orifice so that the core drawn from the circular orifice of the second crucible is substantially concentrically disposed within and spaced from the tube of material drawn from the ring-shaped orifice.

In order to prevent collapsing of the cladding tube during subsequent handling such as drawing the fiber on a drum, the apparatus of the present invention may include means for injecting inert gas in the space between the core and cladding tube as they are drawn from the double crucible. In addition, the apparatus may include a closure member having a projection for closing the circular orifice of the second crucible and an annular projection for closing the ring-shaped orifice of the first crucible and means for moving the closure member along the central axis of the orifice of the first crucible from a position closing said orifices to draw the melt of the first and second crucibles therefrom.

The first and second crucibles may take several different structural embodiments. For example, the first crucible may have a ring-shaped cross section with an outer annular wall and an inner annular wall with the inner annular wall forming an annular wall of the second crucible. In another embodiment, the first crucible has a ring-shaped cross section formed by an external annular wall and an internal annular wall which forms a hollow axially extending space. The axial extending space may have the second crucible supported therein with the wall of the second crucible being spaced from the inner wall of the first crucible or the second crucible may be disposed above the first crucible with the central axis of the orifice of the second crucible approximately coinciding with the axis of the hollow tube of the first crucible so that a core drawn from the orifice of the second crucible passes through the hollow tube and is disposed within a tube drawn from the ring-shaped orifice of the first crucible.

The method of the present invention includes providing a double crucible arrangement of the apparatus, moving the closure member to the position closing said orifices, providing a material of the type desired for the cladding tube in the first crucible and a material of the type desired for the core in the second crucible, bringing said materials to a desired temperature for drawing from the crucibles, moving the closure member from the closing position with the material of the first crucible adhering to the annular projection and the material of the second crucible adhering to the projection plugging the circular orifice therein so that as the closure member is moved into a closing position, a light conductor fiber is drawn with a core surrounded by a loose fitting cladding tube which is spaced therefrom. Preferably, the method includes injecting an inert gas between the core and cladding tube as the light conducting fiber is drawn from the double crucible, the step of heating may include separately heating each of the types of materials to the desired drawing temperature and the heating step may include melting solid glass masses which were inserted into their respective first and second crucibles.

While the term "melt" generally deals with a glass melt, it should be noted that both the method and apparatus of the present invention can utilize synthetic materials, for example those synthetic materials which cure or harden to polymerization. While the method and apparatus can be used for both glasses or selected synthetic materials, at the present time glasses have the better optical property and it is believed that the most satisfactory fibers will be formed from glasses.

Since the method and apparatus of the present invention enable the formation of a light conductive fiber having a highly refined glass core in a loose fitting glass cladding or tube, the problems with light conductive fibers with tight fitting cladding or the eccentric-core optical fibers are overcome. In addition, the problems with a light conductive fiber having a glass core received in a loose fitting cladding tube of synthetic material are greatly reduced and overcome due to the method and apparatus of the present invention.

DESCRIPTION OF THE PREFERRED EMBODIMENTS

Figure 3:
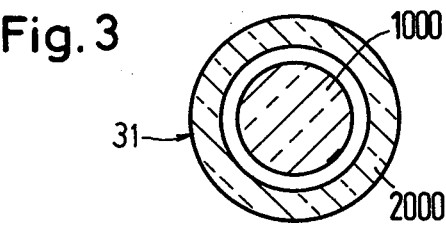
FIG. 3 is a cross-sectional view of an optical fiber produced in the apparatus in accordance with the present invention.

The principles of the present invention are particularly useful in an apparatus having a double crucible generally indicated at 30 for producing a light conducting fiber generally indicated at 31 in FIG. 3. The fiber 31 has a core 1000 in a loose fitting cladding tube or sleeve 2000.

The double crucible 30 includes a first crucible 1 and a second crucible 2. Each of the crucibles 1 and 2 may consist of a material selected from a group consisting of platinum, iridium and platinum-rhodium alloy. The double crucible 30 can also be formed of different materials which are both heat resistant and resistant to chemical reactions or attack.

Figure 1:
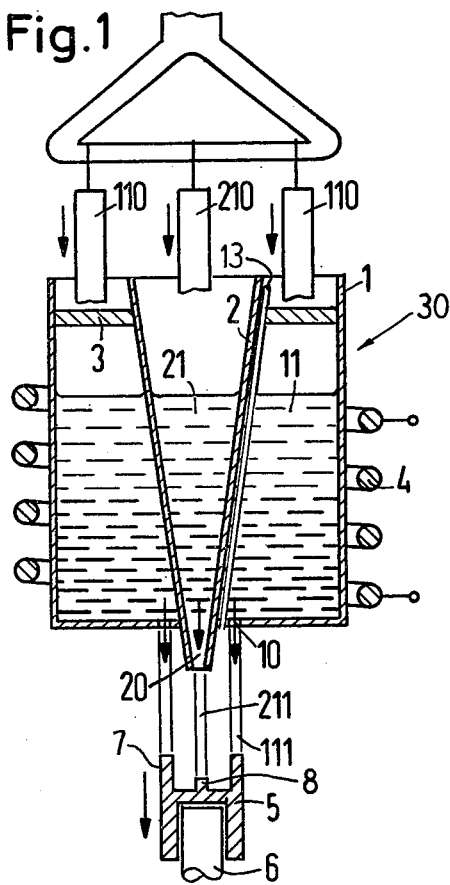
FIG. 1 is a cross section with portions in elevation for purposes of illustration of an apparatus in accordance with the present invention.
Figure 2:
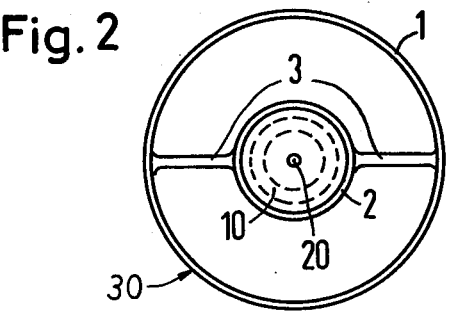
FIG. 2 is a top view of the apparatus of FIG. 1.

As illustrated, the first crucible 1 is an exterior crucible with the second crucible 2 being disposed therein. The exterior or first crucible 1 has the base with a ring-shaped orifice 10 and the second crucible has a single orifice 20 which is of a given diameter that is less than the inner diameter of the ring-shaped orifice 10. As illustrated, the orifice 20 is arranged within the ring-shaped orifice 10 with the center axis of the orifice 20 substantially coinciding with the center of the orifice 10. The second crucible 2 is supported within the first crucible 1 by cross supports such as 3 so that the wall of the second crucible 2 forms an inner annular wall of the first crucible 1. The double crucible arrangement can be heated with the heating system which is illustrated in FIG. 1 as an induction heating system or coil 4.

A closure element 5 is mounted by means for moving which includes a quartz rod 6. The element 5 has an annular projection 7 for closing the orifice 10 and a second projection 8 for closing the orifice 20. The movement of the rod 6 in a direction opposite to the direction of the arrow of FIG. 1 causes the annular projection 7 and the projection 8 to simultaneously close both the orifices 10 and 20.

The first crucible 1 serves for melting of a material such as a glass mass to form a mass of melted material or melt 11 which will be formed into a tube or sleeve 111 which is subsequently drawn into the cladding tube 2000 of the light conductive fiber 31. The internal or second crucible 2 will melt a mass of glass to form a mass of melted material or melt 21 which will eventually form a glass strand 211 that is subsequently formed into a core 1000 of the fiber 31. The amount of glass in each of the melts 11 and 21 can be continuously replenished by the addition of glass and solid bodies such as rods 110 for the melt 11 and the rod 210 for the melt 21. It is obvious that the glass can also be replenished in other forms such as by the addition of solid masses such as in the shape of balls into the melts 11 and 21. It is also possible to refill the crucibles 1 and 2 with a premelted glass melt.

During the melting of the glass compounds in the crucibles 1 and 2, the orifices 10 and 20 of the double crucible 30 are closed by means of the closure element 5. After the melts are obtained, they are brought to the desired temperature for the drawing of the glass fiber which is usually accomplished by allowing them to cool to this temperature. After the melts 11 and 21 have reached the desired temperature for drawing, the closure element 5 is moved axially by the rod 6 in the direction of the arrow so that a glass tube 111 which adheres to the annular projection 7 and a glass strand 211 which adheres to the projection 8 will be drawn through the orifices 10 and 20, respectively. The glass tube 111 will be subsequently formed into the cladding tube 2000 while the strand 211 will be subsequently formed in light conducting fiber core 1000. After the rod 6, which forms means for moving the closure element 5, has moved the element a sufficient distance, the closure element may be removed and the drawn portion comprising the tube 111 with the strand 211 disposed therein is mounted on a conventional winding drum for glass fibers so that a light conducting fiber with a loose fitting glass sleeve can be pulled from the double crucible 30. The size of the cross section of the finished light conducting fiber can be determined by a selection of the pulling velocity.

In order to avoid collapsing of the tube 111 during the pulling of the light conductive fiber 31, an inert gas, for example a nobel gas, can be inserted between the glass tube 111 and the glass strand 211. This insertion can be accomplished by applying the gas through a tube 13 which terminates with a port which is disposed between the ring-shaped orifice 10 and the orifice 20.

As a result of drawing the fiber from the double crucible 30, the fiber 31 will have a light conducting fiber core 1000 which is received in a loose fitting cladding tube 2000 (FIG. 3). As illustrated in the figure, the core 1000 is loosely arranged within the cladding tube or sleeve 2000. The cross section of the fiber core 1000 and the cross section of the tube or sleeve 2000 and the distance between the surface of the core and the inner surface of the sleeve or tube 2000 is determined by the viscosity of the glass melts 11 and 21, the drawing velocity or speed and the geometry of the orifices such as 10 and 20.

Figure 4:
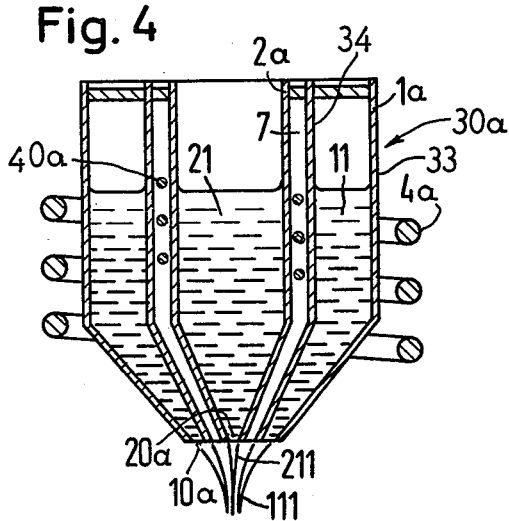
FIG. 4 is a partial cross section of an embodiment of the apparatus of the present invention.

An embodiment of double crucible is generally indicated at 30a in FIG. 4. The double crucible 30a includes a first or outer crucible 1a and a second or interior crucible 2a. As illustrated, the first crucible 1a has an annular outer wall 33 and an inner annular wall 34, which inner annular wall forms an axially extending hollow space 7. The inner or second crucible 2a is supported in the hollow space 7 with its annular wall being spaced from the inner annular wall 34 of the first crucible. As in the previous embodiment, the outer crucible 1a has a ring-shaped orifice 10a and the inner or second crucible 2a has an orifice 20a which is substantially positioned with its center axis coinciding with the center of the orifice 10a. As illustrated, the annular walls 34 and 33 have conical portions which form the orifice 10a and the orifice 20a is formed by a conical portion of the wall of the second crucible 2a. A closure member, which is not illustrated and is similar to member 5, will close the orifices 10a and 20a as the melts are brought to the drawing temperature and will assist in drawing the melts through the orifices 10a and 20a as described hereinabove.

The unfilled portion of the hollow space 7 may be used for applying an inert gas, for example argon or nitrogen, into the space between the annular or ring-shaped orifice 10a and the center orifice 20a so that the inert gas prevents the collapsing of the tube 111 onto the strand 211 as discussed hereinabove. Moreover, the insertion of the inert gas prevents the melting on of the fiber or strand 211 with the sleeve or tube 111.

In this embodiment, each of the two crucibles 1a and 2a may be heated independently of each other. For example, by the addition of an induction heating system 40a in the space 7, the melt 21 in the inner or second crucible 2a can be heated separately from the heating of the melt 11 in the crucible 2a by the induction heating system or coil 4a. Thus, with this embodiment it is possible to use different kinds of materials such as glasses for both the tube 111 and the strand 211 which materials have different desired drawing temperatures.

Figure 5:
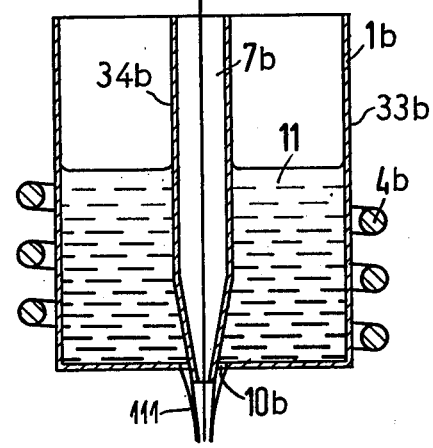
FIG. 5 is a cross-sectional view of another embodiment of the apparatus in accordance with the present invention.

Another embodiment of the double crucible of the apparatus is generally indicated at 30b in FIG. 5. The double crucible includes a first crucible 1b and a second crucible 2b. As illustrated, the first crucible 1b has an exterior annular wall 33b and an interior annular wall 34b to provide an annular-shaped cross section for the crucible 1b with an axially extending tubular space 7b. The second crucible 2b is spatially separated from the first crucible 1b in an axial direction and is provided with its own induction heating system 40b. The second crucible is positioned so that the central axis of its orifice 20b substantially coincides with the center of the ring-shaped orifice 10b of the first crucible 1b. Thus, a strand such as 211 drawn from the orifice 20b will pass through the tubular passage 7b and be disposed within a tube 111 drawn from the ring-shaped orifice 10b.

As in the previous embodiment, an inert gas can be inserted between the tube 111 and the strand 211 by being applied through the passage 7b. Since each crucible 1b and 2b have a separate heating system 4b and 40b, respectively, the melts 11 and 21 can be heated separately and to different drawing temperatures.

In both the double crucibles 30a and 30b of FIGS. 4 and 5, it may be advantageous to additionally provide the glass strand such as 211 with a thin lubricant film, for example a highly refined silicon oil. The friction between the later formed light conducting fiber core and the cladding tube is thus decreased. The double crucibles 30 and 30a exhibit a particular advantage which is that the glass strand 211 which will later form the light conducting core 1000 are as particularly well protected against contamination so that virgin surfaces of the glass strand remain. Thus, an increase in the optical dampening values by the dragging in or creation of scattering centers such as, for example by dust particles or contaminates are avoided during the stretching or drawing of the light conducting fiber. In the double crucible 30b (FIG. 5), it is expedient to arrange the crucibles in a protective chamber in order to prevent the contamination of the strands such as 211 by dust or other contaminates.

Although various minor modifications may be suggested by those versed in the art, it should be understood that we wish to embody within the scope of the patent warranted hereon, all such modifications as reasonably and properly come within the scope of our contribution to the art.

We claim:

1. An apparatus for producing a light conducting fiber having a core disposed in a loose fitting cladding tube with a space therebetween, said apparatus comprising a double crucible arrangement having a first crucible for accommodating a melt for the cladding tube and a second crucible for accommodation of a melt for the core, said second crucible being provided with a circular orifice of a given diameter and the first crucible having a ring-shaped orifice with an inner diameter greater than the given diameter of the circular orifice of the second crucible, said first and second crucible being arranged with the center of the ring-shaped orifice being substantially on a central axis of the circular orifice of the second crucible with the inner diameter being spaced from a periphery of the circular orifice so that the core drawn from the circular orifice of the second crucible is substantially concentrically disposed within and spaced from the tube of material drawn from the ring-shaped orifice.

2. An apparatus according to claim 1, which includes means for injecting an inert gas in the space between the core and the cladding tube as they are drawn from the double crucible.

3. An apparatus according to claim 1, which includes a closure member having a projection for closing the circular orifice of the second crucible and an annular projection for closing the ring-shaped orifice of the first crucible, and means for moving said closure member along the central axis of the orifice of the first crucible from a position closing said orifices to draw the melts of the first and second crucibles therefrom.

4. An apparatus according to claim 1, wherein said first crucible has a bottom wall, an outer annular wall and an inner annular wall, said inner annular wall forming an annular wall of the second crucible.

5. An apparatus according to claim 1, wherein said first crucible has an annular shape with an exterior annular wall and an interior annular wall forming a hollow space, said second crucible being supported in said hollow space with the wall of the second crucible being spaced from the inner annular wall of the first crucible.

6. An apparatus according to claim 1, wherein said first crucible has an annular shape formed by an outer annular wall and an inner annular wall with said inner annular wall forming an axially extending hollow tube, said second crucible being spaced above the first crucible with the central axis of the orifice of the second crucible approximately coinciding with the axis of the hollow tube of the first crucible so that a core drawn from the orifice of the second crucible passes through the hollow tube and is disposed within and spaced from a tube drawn from the ring-shaped orifice of the first crucible.

7. A method for producing a light conducting fiber having a core disposed in a loose fitting cladding tube with a space therebetween, comprising providing a double crucible arrangement having the first crucible for accommodating a melt of the cladding tube and a second crucible for accommodating a melt for the core, said second crucible being provided with a circular orifice of a given diameter and the first crucible having a ring-shaped orifice with an inner diameter greater than the given diameter of the circular orifice of the second crucible, said first and second crucibles being arranged with the center of the ring-shaped orifice being substantially on a central axis of the circular orifice of the second crucible with the inner diameter being spaced from a periphery of the circular orifice, said double crucible including a closure member having a projection for closing the circular orifice of the second crucible and a ring-shaped projection for closing the ring-shaped orifice of the first crucible and means for moving the closure member along the central axis of the circular orifice of the second crucible from a position closing the orifice, moving said closure member to the position closing said orifices, providing melted material of the type desired for the cladding tube in the first crucible and melted material of the type desired for the core in a second crucible, bring said melted materials to a desired temperature for drawing from the crucible, moving the closure member from the closing position with the melted material of the first crucible adhering to the annular projection and the melted material of the second crucible adhering to the projection plugging the circular orifice therein so that as the closure member is moved from a closing position, a light conductor fiber is drawn with a core surrounded by a loose fitting cladding tube which is spaced therefrom.

8. A method according to claim 7, which includes injecting an inert gas in the space between the core and the cladding tube as the light conducting fiber is drawn from the double crucible.

9. A method according to claim 7, wherein the step of providing and bringing comprises separately heating each of the types of material to the desired drawing temperature.

10. A method according to claim 7, wherein the step of providing includes inserting solid masses of the glass into the respective first and second crucibles and heating to melt the solid masses of glass.

* * * * *